Patented Nov. 26, 1946

2,411,557

UNITED STATES PATENT OFFICE 2,411,557

SYNTHETIC PHENOLIC RESINS

Charles H. Schuh, St. Petersburg, Fla., assignor to Carbide and Carbon Chemicals Corporation, a corporation of New York No Drawing. Application February 11, 1943, Serial No. 475,513

8 Claims. (Cl. 260—57)

1

The present invention relates to synthetic resins, and, more particularly, to synthetic phenolic resins or condensation products and to methods of and the means for producing and utilizing such resins and compositions thereof.

It is well known that the prior art is crowded with respect to phenol-aldehyde resins. The condensation reactions have customarily proceeded under alkaline or acidic conditions with refluxing and neutralization of the reaction products from one side to the other, and vacuum distillation to dehydrate the end products. Many operations have been involved and polymerization of the end products has generally been quite advanced. Moreover, these products were quite viscous and required thinning with solvents. Generally speaking, the prior resins have been of the 1 to 1 molecular character. These have been condensed in the presence of acid catalysts producing socalled novalak resins. On the other hand, resins embodying greater than one mol of aldehyde for each mol of phenol have been exclusively condensed with alkaline catalysts for commercial operations. Moreover, these resins have been principally limited to use as cast resins.

The prior resins have generally been made by heating, usually at temperatures of 80° C. to 140° C. In the case of 1:1 resins, alkaline hardening agents or catalysts, particularly formin, have been used to accelerate hardening under the influence of heat. Attempts to harden known alkaline or acid catalyzed liquid resin products by catalysts or agents without use of heat or pressure have met with difficult control problems. Moreover, the hardening agents or catalysts have caused deterioration of the finished product, often rendering the same useless for commercial application. Generally speaking, in order to obtain adequate hardening action it has heretofore been necessary to use a hardening agent or catalyst of such strength that hardening reaction of the liquid resin would proceed so rapidly that it became necessary, in order to have sufficient time in which to use the liquid resin, to also add an agent having a retarding effect, for which purpose alcohol and other organic volatile solvents generally in substantial amounts, between 30% to 60%, have been used. The control of the resin in plastic form was unheard of. In fact, it has often been necessary to cool the liquid mixtures with ice to prevent immediate hardening. Furthermore, volatile solvents have been added to prior liquid resins capable of cold hardening to reduce viscosities, but the amounts required have been relatively high.

2

Attempts have been made to use alkaline hardening agents with alkali-catalyzed resins, but acid hardening agents are known to have advantages thereover, for instance, color, flexibility, etc. However, organic acid catalysts failed because they were not strong enough to harden these liquid resins, while mineral acid agents rendered the liquid resin mass uncontrollable. As to known acid-catalyzed resins, the use of acid hardeners either weak or strong has not been found practical. To obtain some measure of control, it has even been suggested to add very small amounts of acid to alkaline-catalyzed resins slightly acidified with organic acids and dehydrated to the proper consistency, but manifestly such compositions require heat to set and are therefore no longer cold setting.

It will be obvious that where substantial amounts of alcohol or other volatile solvents are used in prior cold setting mixtures, these must evaporate while the resin composition hardens and must continue to do so even after the resin has set. Accordingly, substantial shrinkage must be anticipated. If the resin could possibly be manipulated into a more or less handleable and controllable moldable plastic, the shrinkage losses by volatilization would be so great as to make any resultant product unsatisfactory. Such materials applied to a flexible base will cause the same to curl up during hardening or if applied to a rigid base will crack and pull itself apart from shrinkage. Thus, prior cold setting resins have been limited to liquid resin compositions and to uses principally as adhesives for bonding plywood where shrinkages are not critical and where the material may be quickly used.

It has also heretofore been suggested to incorporate thermo-setting resins in fibre pulp, the resin to be cured after formation of the fibre sheet. The known resins have readily cured at relatively low temperatures. It has therefore been impossible to dry the wet matrix in the conventional drying cycle heretofore used where no synthetic resins were employed and involving temperatures of 315–320° F. for several hours, as the resin would cure; but slow, costly low temperature drying has been made necessary. Only by performing a simultaneous drying and curing step could this procedure be avoided but such was not practicable except as to certain products. Although many attempts have been made to solve the problem confronting the prior art, none has been wholly satisfactory and successful when carried into practice on an industrial scale for the production of commercial products, as far as I am aware.

I have discovered a process for manufacturing a novel phenolic resin which overcomes many of the problems and limitations encountered with prior liquid phenolic resins of the type described.

It is an object of this present invention to provide liquid and plastic phenol-aldehyde condensation resin products not limited to a single application, as has heretofore generally been the case, but capable of a myriad of old and new uses, readily controllable, productive of new and improved coating materials, adhesives or plastics, which may, among other applications, be brushed, sprayed, trowelled, shaped mechanically or by hand, extruded, molded, and rolled and which may be made by a simplified procedure making such resin products of relatively low cost.

It is another object of the invention to provide a phenol-aldehyde resin hardenable to a substantially insoluble and infusible state in the cold or with addition of heat and/or pressure, when combined with an acidic hardening agent or catalyst and which without such agent or catalyst lends itself to drying or hardening in several hours at temperatures up to about 320° F. without progressing to the infusible state; but which will be rendered infusible when treated at temperatures above about 450-475° F. for relatively short and operable periods of time.

The invention also contemplates the provision of partially reacted phenol-aldehyde liquid condensation resins having more than 2 mols of formaldehyde to each mol of phenolic body, the said resins being water insoluble and having a stability characterized by being stable for long periods of time in storage at normal atmospheric temperatures and by a hardening time of 12 to 36 hours, generally about 24 hours, for a resin of 3 to 1 molecular ratio in the presence of 10% of a hardening agent or catalyst comprising 1 part by volume of hydrochloric acid of 36% strength, 1 part by volume of aqueous formaldehyde (37% by weight), and 3 parts by volume of glycerin.

A further object of the invention is the provision of a cold-hardenable phenol-formaldehyde resin composition including small amounts of hardening agent or catalyst, which resin composition is substantially free from highly volatile solvents, which resin composition provides a liquid coating material or adhesive that can be applied in films of small or great thickness, that can harden in the cold within about 24 hours of application and which liquid resin composition by simple manipulation, for instance mechanical agitation and/or evaporation of moisture to increase the concentration of hardening agent, is transformed to a non-sticky plastic capable of retaining its plasticity for desired periods of time, even as much as 8 hours, and in which condition it is readily moldable mechanically or by hand without ill effects, but that adheres to materials of its own kind and to suitable surfaces where adherence is required.

Moreover, it is an object of the invention to provide a strong hardening agent or catalyst for polymerizing partially reacted synthetic resin compositions comprising a strong inorganic acid and formaldehyde dispersed in a substantially non-volatile and non-reaction retarding dispersing agent.

Furthermore, it is an object of the invention to provide a process of making a liquid phenol-aldehyde resin comprising reacting with heat at least two or three mols of formaldehyde with each mol of a phenolic body, in the presence of a weak organic carboxyl acid catalyst, such as salicylic acid or its alkyl derivatives, under conditions just short of boiling and evidenced by substantially little or no reflux action and stopping the reaction at the earliest possible stage to obtain a permanent separation of resin and water layers.

Still further objects of the invention are the provision of a phenol-formaldehyde resin plastic capable of cold molding, shaping and extrusion and hardenable in the cold and/or with aid of heat; and of a cold-hardenable phenol-formaldehyde resin composition which when hardened is characterized by the simulation of porcelain and other vitreous finishes, is color permanent, non-crazing, acid resistant, water insoluble and infusible; and of a cold-hardenable, phenol-formaldehyde plastic characterized when hardened by color permanency, substantially no shrinkage, toughness, machinability, rigidity, or flexibility and substantial strength.

Other objects of my invention will become apparent from the following description of my invention.

Generally speaking, the objects of my invention are realized by a complete departure from conventional procedures. Thus, if a liquid resin is prepared by condensing proper proportions of a phenolic body and formaldehyde in the presence of a weak acid condensing agent or catalyst, under conditions just short of boiling and involving little or no reflux action, and the reaction is stopped at the earliest possible stage to obtain a permanent separation of the resin and water layers, an end resin product will be obtained by which the aforesaid objects may be accomplished and which will have, among other physical properties, a very low viscosity similar to water and a light color and which will cure under heat only with the greatest difficulty.

The liquid resin embodying the present invention can be produced by condensing between 2 to 3½ mols of formaldehyde with each mol of a phenolic body, preferably phenol or a higher phenol, for instance cresol, in the presence of a weak organic carboxyl acid condensing agent or catalyst. I have found that between 2½ or 3 mols of formaldehyde for each mol of phenolic body gives the best results. The use of less than two mols of formaldehyde for each mol of a phenolic body produces an end resin product of high viscosity and poor color, that cures too rapidly for practical application and such amounts of formaldehyde are thus not recommended. On the other hand, if the amount of formaldehyde is increased much beyond 3 mols for each mol of a phenolic body, the amount above 3 mols is merely excess and as such ends up in the aqueous layer obtained by the reaction or is lost. While this is not harmful, it has been found that above 3½ mols of formaldehyde the amount of excess in the reaction mixture is such that the reaction hereinafter described goes faster at the end and is more difficult to stop. The use of less than 3½ mols is, therefore, deemed to be good practice. The acid catalyst to be used for condensing the phenol and formaldehyde will preferably be one that will in such process give a separation of resin and liquid layers in a period from 6 to 12 hours, examples of such acid catalyst being salicylic acid and its alkyl derivatives, for instance, ethylsalicylic acid and butylsalicylic acid. Salicylic acid itself is preferred because of its greater practicability and applicability to the present invention and its lower cost. Only small amounts of condensig agent need to be used in carrying this invention into practice and can vary somewhat dependent upon the molecular ratio of the basic ingredients. The agent is used in a concentration of approximately 3¼ to 5% of the water present in the reaction mixture, about 3½% concentration having been found to produce best results. Under 3¼% concentration the reaction takes too long to complete, generally more than 24 hours and some discoloration results. Above 4 or 5% concentration the reaction has been found to go too fast near the end so that a higher viscosity product results and rapid cooling is sometimes required.

The reaction mixture involved in the present invention is not refluxed as in the conventional procedures, but is allowed to react with the application of heat very slowly at first, until a high degree of acceleration is obtained toward the end of the process, when the heating is stopped. During this period the temperature of the reaction mixture is preferably just under the boiling point so that reflux is just indicated and of negligible amount. Heating is stopped within a short interval, preferably immediately, following initial appearance of resin, generally as a thin layer, at the surface of the liquid mixture. With the preferred procedure this action will take place in about 7 to 8 hours of heating. After a little practice with the process, one skilled in the art can predict the initial resin forming point and heat may then even be stopped slightly before this time without disadvantage. The initial resin forming point may also be generally recognized by the condition of the mixture, which will then generally be substantially clear and light colored and a drop of reflux striking the surface of the liquid mixture will form a slight cloud which disperses as it becomes further distributed, indicating that the resin is beginning to separate though not permanently. Stated still another way, the initial resin-forming or resin-separation stage which is also the preferred stopping point for heating may be generally recognized when the surface of the liquid mixture appears oily and there is a tendency to form an emulsion near the surface. Moreover, at this time the reaction has proceeded to a stage where the liquid resin condensation product which finally separates out is water insoluble, i. e., the heating has been sufficient to carry the reaction to just beyond the water solubility of the resin which is finally obtained upon cooling.

Upon stoppage of the applied heat at the preferred point, the reaction mixture is allowed to air cool. While this takes place the reaction continues somewhat further on its own by internal heat until a permanent separation of resin and aqueous layers occurs. This generally takes place after about ½ to 1 hour of standing or by the time the composition has reached room temperature. The lower of the two layers will be a substantially clear water-insoluble resin of water-like viscosity. The resin may be easily collected by simple mechanical separation, for instance by drawing off the resin layer by gravity or decanting the water layer. Other methods may, of course, be employed.

When heating of the reaction mixture is allowed to continue a short interval beyond the initial resin forming point before stopping, a liquid resin of good brushable or spraying consistency can still be obtained. However, depending upon how far the heating has been allowed to progress and the rate of cooling thereafter, the resin obtained upon final separation may be of a clear to a cloudy color, the latter indicating the presence of small amounts of dispersed water and/or impurities. Also, dependent upon the extent of excess heating the product will be a water-like to more of a thin syrupy viscosity. If heating is allowed to continue as much as ten to twenty minutes beyond the initial resin forming stage, it has been found that the condensation reaction has then progressed to a point substantially equivalent to the permanent separation point of the preferred procedure, i. e., it has been found that the mixture will permanently separate into a resin and an aqueous layer if rapidly chilled to eliminate further progress of the reaction. While this procedure eliminates the gradual cooling period with progressive reaction obtained by stopping the heat at the initial resin forming point and may possibly somewhat reduce the overall time consumption in the process, it is not conducive to best results. It is practically impossible to arrive at the same desired end point as by the preferred procedure, as the reaction velocity is so high at the point of heat stoppage as to generally cause overrunning of the reaction before complete chilling takes place. When this happens a resin product of considerably greater viscosity and lesser stability results. In any case, it will be recognized that the cooling step in the preferred procedure requires no external heating and thus actually saves heat.

When heating of the condensation mixture is allowed to continue more than about one-half hour beyond the initial resin forming stage, it is generally found that the reaction mixture becomes entirely milky; and if the latter takes place it indicates that the reaction has gone too far to obtain a liquid resin product of the preferred form, i. e. one of brushing and spraying viscosity and of great stability. Instead a viscous creamy resin including substantial amounts of dispersed water will be found. The more the heating is continued, the greater will be the viscosity of the resultant resin and while some of these resins may be employable in plastic form, their stability has been so markedly affected that unless immediately used they have practically no value. It will, therefore, be understood that I prefer that heating of the reaction mixture is not to be continued to the point where the mixture becomes milky.

It will be observed that considerable heat is saved by the present process over conventional procedures with refluxing, where the mixture boils for hours. In the present process the temperature is just at the boiling point with substantially no reflux action. Moreover, in the latter part of the present process the reaction may take place while cooling. Furthermore, no heat is applied in removal of the water. In fact, it is a feature of the invention that the water may be easily and completely removed by simply drawing off one layer from the other by gravity, and not as usual by the costly process of boiling it off under a vacuum which also produces a viscous resin end product in contrast to the liquid resin of low water-like viscosity obtained by the foregoing procedure. Having a resin of a water-like viscosity, I am also able to obtain a very complete and easy separation of the layers. This would not otherwise be possible.

Thus, according to the present invention, the water layer may be easily decanted, and the resin layer collected for subsequent use. The water layer has an acid reaction and contains substantially all of the condensing catalyst and some free formaldehyde. The latter may be vaporized for collection and re-use. The water may also be evaporated and the catalyst recovered in this manner. The liquid resin end product obtained in the foregoing manner will be found to possess a slight acid reaction. Moreover, it has a water-like viscosity and has a light water-like color when the raw materials of the process have been free of impurities. The color of the resin will be clear but possessing a straw tint or darker shade depending upon the amount of impurities present in the reaction mixture. The liquid resin is furthermore particularly identifiable by its stable properties. It cannot be hardened to an insoluble and infusible state at normal temperatures without aid of a hardening agent, unless heated for extremely long periods. For example, at 95° C. it would take two weeks to obtain a hard product which even then would not be completely insoluble in the usual solvents, such as alcohol or acetone. In fact, the resin is so stable that it will not cure fast enough under temperatures ordinarily used for molding operations or even for cast resin manufacture. However, by heating the new liquid resin at high temperatures around 450° to 475° F. or higher for several minutes, the resin is rapidly changed to the completely insoluble and infusible state. The liquid resin end product also remains liquid and stable for long periods of time at normal atmospheric temperatures, with some increasing viscosity thereafter indicating an extremely slow polymerization. Test samples stored for over a year at ordinary room temperatures, including summer heat, have not jellied. Even ordinary agitation will not increase viscosity. Color is also relatively stable and becomes somewhat straw-like or darkened as the viscosity changes. The stability of the liquid resin will be affected somewhat by the thoroughness of the separation of the resin layer from the water layer. Since this can, with simple care, be done quite thoroughly, the resulting liquid resin is therefore relatively free of catalyst which in the preferred procedure is only a weak one. While unnecessary, the resin may be washed to neutralize any traces of catalyst. This merely stabilizes the resin that much more. However, the foregoing is sometimes a desirable step, for instance, where the resin is to be used in a suspension with other materials where the presence of slight amounts of acid would cause untimely precipitation of such other substance, or where, for example, the liquid resin is to be made into an emulsion.

The raw liquid resin and product embodying the present invention has many uses. For example, it is particularly useful as an addition for bonding and giving water-proofing qualities to fiber board products. It, moreover, permits rapid drying of the product at high temperatures heretofore impossible where thermo-setting synthetic resins were employed, unless the resin was to be cured and makes possible fiber products heretofore uneconomical to produce. Thus, for instance, my new liquid resin can be added in desired amounts, small quantities being sufficient, to the usual fiber-board pulp suspension or it may readily and desirably be emulsified in water with an agent, for instance, a small amount of gum arabic and added to the suspension in small amounts, for example 1½ to 6% or more, if desired. If the latter form is used the emulsion is precipitated in the conventional way with alum. The suspended pulp is then run through the usual board-forming process on a suction drum type of board-forming machine to form boards. The boards are dried in the usual roller conveyor type of continuous dryer at the customary temperature of 315° F., heretofore employed for boards containing no thermosetting resin, and over the usual period of several hours to a dry condition, without the synthetic resin added thereto becoming fully set and hardened, i. e. without having become cured. The result is a fiber board product of water repellent and stiffened properties in which the contained resin of the invention is water insoluble but is fusible. Obviously, the product is a splendid one for thermal insulation.

The invention provides fiber board products containing a phenol-formaldehyde resin hardenable at a temperature between 310° to 320° F. for 2 to 5 hours without being rendered infusible.

If a hard press type of board is desired, it is now merely necessary to insert the initial product in its dry condition in a hot press and hot-press it into a satisfactory so-called hard press-board. For example, it may be pressed under a pressure of about 1500 lbs. per square inch at a temperature of 450° F. for about 3 to 6 minutes, "breathing" the board after the first minute. By this treatment the novel resin which was added to the pulp is converted to the completely insoluble and infusible condition and bonds the fiber structure permanently in the compressed condition. It is surprising that in making fiber board with the present phenolic resin that the resin does not cure under the heating taking place in the drying operation which would ordinarily cure prior phenolic resins and also the fact that a satisfactory press-board can be made with as little as 1–1½% of this resin. It will be recognized that the new features make it possible to produce both thermal insulation and press-board products from a single form of fiber board. This has not been possible heretofore.

One of the further surprising features of the novel liquid resin and product is that while extremely stable under normal conditions it may nevertheless be rendered self or cold hardening and the hardening action may be controlled. This feature makes possible an untold number of additional uses for the new resin. Moreover, it is now possible to use my new resin in many old processes in which use of the raw resin alone would have been impossible. Furthermore, my new resin in combination with suitable hardening agents may be processed in many ways impossible with respect to prior phenolic resins, including those hardened with the aid of hardening catalysts or agents. The resultant products, as will be hereinafter seen, are much superior to those previously produced and many were not heretofore even possible.

The proper hardening agents or catalysts to be used with my new resin have been discovered only after much experimentation and constitute a further important feature of my invention. Thus, for example, known alkaline hardeners or catalysts insofar as I am now aware will not function at all in this invention. Weak acids have little or no effect and strong acids, particularly strong mineral acids, for instance concentrated hydrochloric acid (36% strength), when used alone, only thicken the resin and would require heat to complete the setting and curing. Thus, it will be recognized that cold-hardening of the resin of this invention has presented a vexatious problem and that the use of strong agents which in the case of liquid resin heretofore known in the art would have hardened them in a matter of minutes are not strong enough or effective in this invention unless heat is thereafter used to complete the curing. While this may be done, it is obviously not always practical and in some cases inadequate.

It has been discovered that an effective cold-hardening agent or catalyst for the resins of this invention may be prepared by combining a strong acid with a small amount of aqueous formaldehyde and dissolving both in a carrier substance that is substantially non-volatile and will not act to retard the hardening reaction of the resin and which, furthermore, will serve as a good dispersing medium in the liquid resin for the acid and formaldehyde. The said composition provides a catalyst or hardening agent that is readily dispersed throughout the liquid resin and enables a controlled hardening to be obtained which may be sufficiently rapid for commercial operations, 24 hours or less for complete hardening, and sufficiently slow to permit commercial operations to be carried out in the best known manner. For some reason as yet unexplainable, the combining of formaldehyde with the acid in the manner described produces a cold-hardening composition having a reactive effect upon the liquid resin of the invention out of all proportions to the reactive properties of the individual ingredients, including the strongest of known catalysts. For the non-volatile carrier in which to disperse the acid and formaldehyde I have found glycerin to be most effective. As the acid in the hardening composition for liquid resins of this invention, it is preferred to use hydrochloric acid or nitric acid. Sulphuric acid has not been found to be sufficiently effective because while it hardens the resin it does not carry the polymerization to a complete state in a sufficient time and would require heat to supplement it. Other acids of lesser strength are less effective. Such acids as oxalic, acetic, citric, lactic, phosphoric and tartaric commonly used as hardening agents alone are not useful in the hardening composition for the resins of this invention. However, these and other acids may be employed in the hardening composition of this invention for providing hardening catalysts or agents for known resins such as novalaks and liquid coating resins where the new hardening composition will provide its hardening control features.

As a typical procedure of compounding the hardening agent or catalyst for my new resin, about 1 to 5 parts by volume of 37% aqueous formaldehyde (40% by volume) is combined with about one part of a strong acid, for instance, about one part of a mineral acid such as hydrochloric acid of 36% strength. These two components are then mixed with an equal amount by volume of glycerin. It has been found that more or less glycerin may be used over a wide range with varying results. However, it is preferred that at least an equal amount by volume be employed. The hardening composition is substantially stable and may be stored for long periods of time before use. The amount of special hardening agent or catalyst to use for best results with the liquid resin of the invention may vary from about 3% to 4% thereof to about 15% to 20% by weight and even greater amounts may be used where volatile losses are not critical. When used in amounts much under 3% the tendency of the hardener is merely to stiffen the resin mass and not completely harden it. It is also to be observed that it is not necessary to use corresponding larger amounts of the hardening composition in order to incorporate greater amounts of glycerin if the latter is desired for its plasticizing effect. The additional glycerin may be added either to the hardener or to the liquid resin or to the mixture of the two. A surprising result with the use of glycerin in this invention is that with as much as 100% of glycerin employed, based upon the weight of the liquid resin, good results may be obtained, and such suggests that the glycerin in the present invention where used in such large amounts does not act purely as a plasticizer, but actually enters into chemical combination with the resin. This belief is strengthened by the known fact that when an excess of glycerin was added to known prior liquid phenolic resins which were then hardened, the excess, over about 15 to 25%, dependent upon the type of resin, sweated out showing that there was no chemical combination of the glycerin in the product. Under the present invention such action does not take place but the glycerin remains stable in the product. I have further discovered that when large amounts of glycerin are used the rubbery condition hereinafter referred to is accelerated. Other substantially non-volatile and non-retardant-carrying agents for the acid and formaldehyde may be employed, among them plasticizers such as tricresyl phosphate and dibutyl phthalate. However, glycerin is preferred as it disperses the hardener better than these other substances and the latter substances are sometimes conducive to bubbling and fogging in liquid coatings of the resin and hardener.

Once the hardening composition has been added to the liquid resin the latter will undergo a continuous reaction during which the resin composition will pass through several stages of increasing viscosity until final hardening to an insoluble and infusible condition. The action is completely controllable and the time of hardening will be dependent upon the method of handling the resin composition and upon the character of application for which it is to be used, for instance, coating or plastic. If permitted to remain in a closed container or in an open pail the resin composition may remain in a substantially liquid condition for many hours before much change in viscosity is noted. Generally the hardening composition will be added to the liquid resin at the time of use, this being particularly desirable where the lowest viscosity liquid resin composition is desired for working. However, where the plastic form of resin composition is to be used the mixture may be prepared a suitable period in advance which will be readily determinable upon mixing of a few batches of material so that no time is lost in using the plastic that is thus obtained. Where it is desired to accelerate thickening of the resin composition to a desired point before use, such acceleration may be obtained by agitating the resin composition, i. e. the liquid resin and hardening composition combined. It is believed that this mechanical action brings about a more intimate contact of the composition with the air and causes an evaporation of moisture in the composition present through addition of the hardener and also causes an increase in the concentration of the acid hardener present. However, it will be understood that my invention is independent of all theories and the foregoing merely indicates my present beliefs. If the composition is warmed by the application of heat, the resin composition will thicken even more quickly. Surprisingly, if the resin composition is brought to a workable and moldable plastic state, either by standing or agitating or warming or any combination thereof, it does not then immediately pass into a hard and cured mass, but permits ample time for hand molding and other mechanical operations to be performed. The mixture passes through a pasty putty-like state in which it sticks to everything to which it comes in contact. In this pasty form as in the liquid state the resin composition is admirably adapted as an adhesive. It has been further discovered that if this pasty sticky resin mass is further agitated as by continued mixing to accelerate the hardening reaction taking place, the mass becomes substantially non-sticky and in that state may be handled and molded or shaped by hand or tool without any difficulty whatever. Although the plastic resin composition in this state will not readily stick to the objects with which it is handled or with which it comes in contact, it will stick and adhere to itself in any condition and bonding of the plastic composition will moreover take place with respect to objects to which it is desired to bond the same if the plastic is permitted to remain in contact with the object for a sufficiently long time, for instance during the time it is hardening. Continued agitation of the resin beyond the non-sticky stage will soon cause the mass to pass into a state in which it will no longer adhere to objects even after long periods of contact and finally will not even adhere to itself when pressed together. In the latter condition, the resin mass also becomes somewhat rubbery and while it may be shaped to some degree it will not hold its exact shape due to its spring-back or rubbery nature. Thus, the period to utilize my novel plastic composition for molding and other shaping purposes lies between the time that it will no longer stick to the hand and the time it becomes rubbery, this depending upon the handling of the composition and the amount of hardening agent employed may be varied for example from about ½ hour to at least 6 to 8 hours.

The novel liquid resin composition when combined with the new hardening composition may be used as a coating material or a bonding material all by itself and has advantages over other coatings, adhesives and finishing materials in this respect. Moreover, such material may be applied by brushing, spraying or dipping. It may be applied in any thickness in one coat and will harden all the way through. Since it does not contain any highly volatile solvents, there is no shrinkage in thickness of the final film obtained and no tendency to craze and crack due to volume shrinkage from loss of solvents. Furthermore, there is little or no penetration of the material when applied over surfaces such as wood or other non-metallic surfaces due to the absence of solvents which generally penetrate such materials readily and carry the dissolved resin into the body of the material. It is well-known that with any kind of varnish, for example, it is impossible to obtain a smooth, continuous film on a wood floor over which the same is applied in less than several coats. The first one or two coats soak into the wood. With the new liquid resin composition, there is a negligible penetration even at low viscosities and the liquid composition can, moreover, be brought to any desired viscosity for thick coatings. Of course, it will be understood that if for any reason it is desired to obtain penetrability, a volatile solvent, for instance alcohol, acetone and similar organic substances may be used in any amount desired, but it will be manifest that certain disadvantages thereof must be expected. Preferably, I use sulfonated alcohols such as Tergitol penetrant No. 4, a product of Carbide and Carbon Chemical Corporation which has no disadvantages with the resin composition of this invention, particularly as it need only be used in amount of about 1/10% by weight of the liquid resin composition. Insofar as I am aware, the addition of solvents should not be necessary for the conventional uses to which liquid resin coatings have heretofore been applied. The degree of low penetration at low viscosities of the liquid resin composition of this invention also provides important advantages where it is desired to use the resin composition as a cold setting bonding adhesive. Thus, the composition can be used at water-like viscosities as an adhesive for bonding plywood or similar materials. Since there are no volatile organic solvents present in the mixture forming the resin composition, which would naturally be lost in the application, the liquid resin composition employed for such purposes is, therefore, much less expensive from pound of actual resin in the finished bond.

Hardened coatings of the new resin composition are water-insoluble and infusible, resistant to most acids including concentrated hydrochloric acid, boiling water, oils, etc., have a high color stability when exposed to ultra-violet and actinic light and are highly resistant in weather exposure. In general, under normal conditions, films of the liquid resin composition will harden to a hard glass-like condition within 24 hours after application. It will be understood that numerous extending materials may be incorporated in the liquid resin composition to obtain coloring and other characteristics. Coloring agents, such as dyes and oxides that will not be substantially affected by the acidic condition of the resin composition, are preferably employed. Neutral or acid reacting fillers, for instance wood flour, silica, diatomaceous earth and the like substances, can be added to extend the liquid composition. Another important application of the liquid resin composition, in view of its hardening into a glass-like surface coating which will not crack, when painted upon a surface, is its use in connection with the plastic form of the resin composition of this invention. It may be advantageously employed as a priming coat on surfaces to which it is desired to adhere the new plastic resin composition, for instance, metallic surfaces, glass, wood, cement, etc. The liquid adheres well to these and other surfaces and this is particularly true where glycerin has been included in the composition and the composition is either very low or very high in this respect. The plastic resin composition will generally be applied over this priming coating after the coating has set but may still be somewhat tacky. It has been found that the plastic composition and the liquid coating weld together into one material. The liquid resin coating composition may furthermore be employed as a finish on top of the plastic resin composition to obtain many novel decorative results. When applied as a finish coat over the top of a plastic resin layer of the invention, even after the latter has set hard, it seems to weld together in the same manner and produces a glass-like porcelain finish. It will be understood that it is not necessary to finish the plastic composition with a liquid coating, since a very smooth finish can be produced directly on the plastic if properly handled. However, in case of injury to a surface of this material it becomes possible by means of the liquid coating to refinish the surface very easily and at low cost. Most important, this may be done at any time. Thus, the liquid resin composition may serve both as a filler and coating and this has many additional applications. For instance, many woods that have a rough surface may be finished with a substantially smooth resin surface. Many objects made, for instance, of prior cast resins have rough surfaces when the burrs and mold fins are ground off. These heretofore had to be surface finished and buffed. A coating of the liquid resin of this invention will fill in the rough surface marks and cover the surface with a smooth glossy finish, thus eliminating many prior operations. Moreover, this new result makes possible the casting of cores of a single color and providing colors through the medium of the surface coating.

A further feature of the invention with respect to coating of my liquid resin composition is the discovery that smoother coatings free of alligatoring, non-uniformity of color and free of pinholes and the like may be obtained by incorporating in the liquid coating composition certain substances I have discovered to particularly alleviate such conditions. Thus, for example, I have found that if a small quantity, for instance from about 2% by weight of the liquid resin composition, of soya bean oil be added to the liquid composition the possibilities of alligatoring in the application of the coating will be entirely eliminated. Large amounts may be used. Above 10% the composition gets greasy. About 5% is a good limit. Generally this oil may be substituted for equal amounts of glycerin or other plasticizing agent which may have been incorporated in the liquid composition. Furthermore, I have surprisingly discovered that small amounts of gum arabic about three-tenths of one per cent by weight of the liquid composition dissolved in formaldehyde when added to the liquid composition does away with fogging spots and pinholes in the coating and permits the coating to set in a smooth uniformly colored condition. Preferably, though not necessarily, the foregoing substance will be added to the liquid resin before the addition of the hardener.

Manifestly, the plastic form of the new resin provides a composition for many unique uses. Moreover, it provides an excellent base for compounding. Thus, in addition to the substances previously mentioned, many materials that are not compatible with the liquid form of the resin composition can be readily mixed in and incorporated into the plastic form of the resin composition and provide a unique means of modifying the properties of the finished products. Various oils, liquid resins, and other types of plastic materials may be incorporated as well as the more obvious fillers of all kinds, pigments and the like. For example, chlorinated rubber may be incorporated into the plastic mass to provide greater flexibility of the finished product and cheap oils, such as soya bean oil, may be added to provide additional plasticity and a lower cost of the finished product. However, it will be understood that it is not necessary to use any filler at all to obtain desirable products with the plastic form of the resin composition of this invention. An important feature of the plastic form of resin composition is that even when substantial amounts of acid have been included with the incorporated hardener the plastic resin mass is not corrosive and will not attack the skin when handled by human hands for hours at a time. This is believed due to the protection afforded by dissolving the acid in the carrying agent, particularly glycerin and by the resin in which it is dispersed. The liquid resin form of the composition, however, does have a tendency to attack the skin and be corrosive when substantial amounts of acid have been used.

The plastic form of the resin composition may be applied and utilized in an unlimited number of ways: it may be shaped by hand into various forms and allowed to harden; it may be cold molded by machine, in which case it will be removed from the machine already cured; it may be cold molded by machine and then allowed to harden; it may be extruded into various continuous shapes and forms, for example, tubes, rods, either hot or cold and air cured later or quickly finished cured with heat. Articles which have been formed from the plastic and partially hardened by standing overnight can be completely hardened by placing in hot oil for a few minutes or being otherwise heated. In plastic form, the resin composition material can be wrapped around a rod-like object, allowed to harden and then removed, thus producing a piece of pipe or tubing. In a similar manner, the plastic may be used for connecting two pieces of pipe or tubing whether of the same or different sizes by simply wrapping the plastic around the joint and allowing it to harden. In the latter case, the tubing may be first primed or coated with the liquid composition at the joint to provide immediate adhesion. This would replace at very low cost the very expensive pipe fittings used especially in the field of corrosive resistant piping and provide a very much better job at only a fraction of the present installation cost. In a similar manner, the plastic resin may be applied as a tank lining or other surface lining or finish in any desired thickness and for covering agitators, drain boards, sinks, tubs and other equipment and the like, to provide corrosive resistance. Moreover, the plastic may be employed as a caulking compound, particularly with respect to water and sewer pipes, the joining of which has heretofore been both expensive and difficult. Furthermore, the plastic in proper compositions can be rolled into thin sheets either transparent, translucent, or colored. As one skilled in the art will readily appreciate, there is an infinite variety of applications for my new product.

For the purpose of giving those skilled in the art a better understanding of my invention, the following illustrative examples are given:

*Example 1*

9.2 ounces of salicylic acid are added to 25.8 pounds of 37% formaldehyde solution and thoroughly mixed. This mixture can preferably stand for about ½ hour. To this is added 10 pounds of phenol. The solution then comprises 1 mol of phenol to 3 mols of formaldehyde and 3½% of salicylic acid based on the amount of water present. The solution is then placed over a steam bath and heated so that there is a slight indication of reflux. The mixture will not boil, but there will be a slow circulation therein due to the heat. This heat is continued until a slight oily layer appears at the surface and there is an indication of the formation of an emulsion around the sides of the vessel, which is further indicated by a slight cloud formed when a drop of reflux strikes the surface of the clear solution, which again disappears as it becomes further distributed in the solution. Heating is now stopped and the still clear solution is allowed to cool without being disturbed. The period of heating up to this point is about 8 to 10 hours. When cool, a layer of clear liquid resin will have settled out at the bottom of the vessel with a clear aqueous layer on the top. The aqueous layer is then drawn off leaving a clear resin layer. When relatively small quantities of material are involved this separation can also be carried out more effectively in a separatory funnel. Approximately 34 pounds of clear liquid resin (which is water-white in the absence of impurities and has a water-like viscosity) are obtained. This liquid resin, while it may be cured hard by heating over a sufficiently long time, cures with great difficulty. It may be kept for long periods of time at room temperature without any substantial increase in viscosity. It may also be heated to 100 degrees for several hours without curing hard. This liquid resin has many uses, as illustrated by the following examples.

*Example 2*

19.8 pounds of liquid resin of Example 1 are thoroughly mixed with 11 pounds of a 2% gum arabic solution to form an emulsion and this is added to a dilute fiber suspension comprising 1,000 pounds of ground pulped wood, such as is used in making ordinary fiber board, in approximately 15,000 pounds of water. 11 pounds of alum are added and the suspension is then run into a standard Oliver board forming machine, such as is used in making fiber board. The wet board from the Oliver machine is run through a Coe dryer at approximately 310 degrees F. for approximately 5 hours, as in the normal practice of making fiberboard. The finished board will be similar to ordinary fiber board, but will have a somewhat higher strength and rigidity. It will contain approximately 2% of the phenolic resin. The novel feature of this product in contrast to present fiber board is that it may be hot-pressed while in the dry condition into a so-called hard press board. In other words, the resin has not been cured in the dryer but may be cured by pressing the board at the proper temperature and pressure. It has been found that satisfactory results can be obtained by pressing at 475 degrees F. and 1,500 pounds per square inch pressure for three minutes with a release of pressure after one minute for breathing. Under these conditions the board does not spring back and also does not adhere to the hot plates of the press, and a smooth and very satisfactory product is obtained. This product will have a density of approximately 60 pounds per cubic foot and a transverse strength of about 4,000 pounds per square inch. These figures will vary, of course, with the type of wood employed and the particular method of grinding and pulping of same in preparation for use in normal fiber board.

*Example 3*

5.7 grams of 36% hydrochloric acid are added to 17 grams of glycerine. 0.85 gram of gum arabic are dissolved in 5.7 grams of 37% formaldehyde solution and this material is added to the glycerine, hydrochloric acid mixture. 5.7 grams of soybean oil are mixed into 10 ounces of the liquid resin of Example 1, and then the mixture of glycerine, hydrochloric acid, formaldehyde and gum arabic is added thereto. The resultant mixture has a low viscosity similar to a thin oil, such as linseed oil, and is clear or just slightly cloudy. This liquid may be used as a coating material. It can be painted on wood surfaces, and when used immediately after mixing, will be thin enough to give a fair amount of penetration, and form a very thin coating. If allowed to stand several hours after mixing, the viscosity will gradually increase. Any agitation during the process of standing after mixing will tend to increase the viscosity. For thick coatings the viscosity may be allowed to become high enough so that any desired thickness of coating is obtained in one application. The liquid may be applied with a brush or sprayed if the viscosity is sufficiently low. In either case, the coating will become dry to the touch in a few hours, and will dry to a hard glossy finish in about 24 hours. A smooth coating is obtained free from alligator effect and the like, and free from bubbles and pin holes. When applied in thin coats, the hardened material is transparent, while in thicker coatings it becomes opaque or clouded in appearance somewhat similar to the cast phenolic resins. The completely cured and hard coating will be insoluble in ordinary solvents including alcohol and acetone. This coating will also stand hot water treatments and may be placed in boiling water for several hours without cracking or injuring the surface.

*Example 4*

2½ ounces of 36% hydrochloric acid are mixed with 2½ ounces of 37% formaldehyde solution. This is mixed with 10 ounces of glycerine. A clear liquid hardening agent is obtained. This hardening agent mixture is then added to 6.25 pounds of liquid resin of Example 1 and the resultant mass is mixed together for several hours during which the viscosity gradually increases until a thick plastic mass is obtained. This reaction may be speeded up by slightly warming the mixture. The plastic mass will at first be very sticky, but will gradually lose this tackiness so that it may be handled without adhering to the fingers or surfaces with which it comes in contact. As the mixing is continued beyond this stage, the plastic mass continues to stiffen until it has reached a point at which it will hold its shape and will not flatten out under its own weight. This may take 2 to 3 hours at normal temperatures under a medium degree of mixing. The plastic mass will be clouded and opaque. At this point the plastic can be molded into any shape, either by hand or mechanically and allowed to stand for complete hardening and curing. The product will be set and sufficiently hard to handle in twenty-four hours, although it will take somewhat longer for the curing to be sufficiently complete to render the product insoluble and infusable. It may be pointed out here that the plastic mass after having reached the state of being in proper condition for molding will remain in this condition for several hours when kept in a closed vessel without further mixing. If, however, the mixing of the plastic is continued beyond this point, it will finally reach a condition in which the material will become rubbery and will not longer hold its shape when molded. In such a state it will no longer be suitable for cold plastic moulding. The period of satisfactory cold plastic molding, therefore, lies between the point at which the material becomes non-tacky and the point at which it becomes rubbery in characteristic. The plastic mass when cold molded and allowed to properly harden will be found to have properties desirable for many articles now being made by cast and machined phenolic resins, such as handles, various types of knobs, lamp bases, etc. Of course, the various coloring agents may be added to the plastic while still in the liquid state, such as artificial dyestuffs, pigments, etc. The amount of plasticizer may be varied and additional plasticizing agents may be added as well, such as additional amounts of dibutyl phthalate, tricresyl phosphate and other commonly used plasticizing agents. It may be pointed out here that the condition of these agents becomes less critical from the standpoint of compatibility when the mixture is made in the plastic condition rather than in the purely liquid phase. The properties of the resultant set and cured products will, of course, be dependent on the amounts and types of plasticizing agents used. The finished properties of the more high plasticized products may be further influenced by a tempering process whereby such products may be further hardened by subjecting to a heat treatment, as for example, placing in an oil bath for 5 to 20 minutes at 100 to 140 degrees C. The product so treated will have a maximum degree of strength and hardness. Prolonged treatment, however, will result in more or less brittleness in the finished product, unless highly plasticized.

It is to be noted that in the preparation of my novel resins on an industrial scale, a practical method for determining the initial resin forming stage involves:

In using large quantities, such as 1,000 pounds, the heating period is stopped slightly short of the point at which the heating is stopped when operating with small quantities, such as one pound. This difference must necessarily be determined by experimentation as it will depend upon the size of batch and type of equipment, as well as the method of heating. Where the equipment is of such type that heat radiation is substantial, or where there is provision for some method of cooling, this difference becomes less and may be negligible—the object in any case being to utilize the heat in the reaction mass to complete the reaction or, stated differently, to prevent over-shooting the endpoint by such heating as might be obtained through the internal heat of the reaction mass after external heating has been stopped.

It is to be observed that the present invention contemplates the following new formulae and proportions in the production of novel synthetic phenolic resins:

1. The combination of formaldehyde, phenol, salicylic acid, glycerine, hydrochloric acid and formaldehyde, as described hereinbefore.
2. The combination of No. 1 together with soybean oil.
3. The combination of No. 1 together with gum arabic.
4. The combination of No. 1 together with Tergitol and with alcohol.
5. The combination of No. 1 together with chlorinated rubber.
6. The combination of No. 1 together with Novalak.
7. The combination of No. 1 together with linseed oil.
8. The combination of No. 1 together with linseed oil and with rosin.
9. The combination of formaldehyde, phenol, salicylic acid, tricresyl phosphate, hydrochloric acid and formaldehyde.
10. The combination of formaldehyde, phenol, salicylic acid, dibutyl phthalate, hydrochloric acid and formaldehyde.

Furthermore, the present invention contemplates a new process of producing synthetic phenolic resins comprising the following novel combination of operations:

1. Use of high molecular ratio of formaldehyde to phenol.
2. Use of special weak organic acid catalyst.
3. No substantial refluxing.
4. Stopping reaction at point just beyond the solubility of the first form of resin condensation product obtained in the reaction mass.
5. Immediate separation of resin condensation product from the aqueous components of the reaction mass by means, other than distillation, such as gravity and decantation.
6. Separation of resin in the condition of water-like viscosity.
7. Very thorough separation of water from resin.
8. Very thorough separation of catalyst from the resin of water-like viscosity obtained.
9. Making water-like resin suitable for various uses by the addition of special hardening agent.
10. Controlling the final hardening of the resin by use of proper quantities of special hardening agent.
11. Addition of special agents to eliminate alligatoring, bubbles, etc., when liquid resin is used as a coating material.
12. Working liquid resin into the proper plastic state with use of special hardening agent and shaping plastic mass.
13. Allowing plastic mass to air harden.

Moreover, the present invention contemplates the production of a novel synthetic phenolic resin having the following characteristics:

1. Great stability in liquid form.
2. Water-like viscosity in liquid form.
3. Being light colored to water-white.
4. Capable of being air hardened with special agent.
5. Capable of being hardened under controllable conditions.
6. Capable of being used in liquid condition with solvent thinner as a coating material.

It is likewise within the contemplation of the present invention to provide a novel synthetic phenolic resin capable of many uses, some of the more important ones of which are as follows:

1. As a self-hardening paint or finish coating without thinner.
2. As a thick plastic to be shaped, moulded, etc.
3. As an extrusion plastic.
4. As an injection plastic.
5. As an adhesive, which is capable of being stored for long periods in the liquid condition.
6. In compounding with other materials.
7. In making hard press board.
8. In binding together articles such as pipe or tubing.
9. As a cold setting resin.
10. As a hot setting resin.
11. In preparing light colored resin products.

Furthermore, my invention relates to synthetic resins of this type, embodying more than two mols of formaldehyde for each mol of phenolic body, which resins are substantially stable at ordinary temperatures for extensive periods of time, can be cured to a hardened insoluble and infusible condition in short time intervals only at unusually high temperatures, and permit of drying without curing at temperatures heretofore rendering resins of this type fully reacted.

Moreover, my invention especially relates to synthetic resins of the character described herein forming compositions hardenable to a substantially infusible and insoluble state in the cold, with hardening agents or catalysts especially developed therefore and which compositions can be advantageously handled as coatings, adhesives or plastics; show little shrinkage while hardening; harden to a non-brittle state; possess ample strength; can be compounded and colored; can be made, among other colors, in light pastel shades which will not become altered upon hardening or subsequently and in the plastic form permit of sufficient time for shaping, extruding or other operations by hand or mechanically.

Although the present invention has been described in connection with a few preferred embodiments thereof, variations and modifications may be resorted to by those skilled in the art without departing from the principles of the present invention. I consider all of these variations and modifications as within the true spirit and scope of the present invention, as disclosed in the foregoing description and defined by the appended claims.

I claim:

1. A process for making liquid phenol-formaldehyde resin condensation product which comprises reacting from two to three mols of formaldehyde with each mol of phenol in the presence of an acid catalyst selected from the group consisting of salicylic acid, ethyl salicylic acid and butyl salicylic acid in a concentration of from 3¼ to 5% of the water present in the reaction mixture, heating the reaction mixture so as to conduct the reaction at a temperature just short of boiling without substantial reflux, arresting the heating within a short time after the initial appearance of water-insoluble resin, allowing the mixture to separate into layers and separating the resin layer from the remainder of the mixture.

2. A process for making liquid phenol-formaldehyde resin condensation product which comprises reacting formaldehyde with phenol in the ratio of from two to three mols of formaldehyde with one mol of phenol in the presence of salicylic acid in a concentration of approximately 3¼% to 5% of the water present in the reaction mixture, conducting the reaction at a temperature just short of boiling with substantially no reflux and stopping the reaction at the first sign of resin separation, allowing the mixture to cool and settle and separating the resin layer from the said mixture.

3. A process for making phenol-formaldehyde resin condensation product which comprises reacting two to three mols of formaldehyde with each mol of phenol in the presence of 3¼% to 5% of salicylic acid based on the amount of water present in the reaction mixture, conducting the reaction at a temperature just short of boiling with substantially no reflux, stopping the reaction at the first sign of resin separation, allowing the mixture to cool and settle to form a phenol-formaldehyde resin layer and a non-resin layer, separating the phenol-formaldehyde resin layer from the mixture, said phenol-formaldehyde resin product having a viscosity range between water-like and a thin syrup, and hardening the said resin product by heating at a temperature of substantially 320° F. without reaching the infusible state.

4. A process for making phenol-formaldehyde resin condensation product which comprises reacting two to three mols of formaldehyde with each mol of phenol in the presence of 3¼% to 5% of salicylic acid based on the amount of water present in the reaction mixture, conducting the reaction at a temperature just short of boiling with substantially no reflux, stopping the reaction at the first sign of resin separation, allowing the mixture to cool and settle to form a phenol-formaldehyde resin layer and a non-resin layer, separating the phenol-formaldehyde resin layer from the mixture, said phenol-formaldehyde resin product having a viscosity range between water-like and a thin syrup, adding about 10% of a hardening agent comprising substantially one part by volume of 36% hydrochloric acid, substantially one part by volume of 37% formaldehyde and substantially three parts by volume of glycerine, and hardening the product for a period of from about 12 to 36 hours.

5. A phenol-formaldehyde condensation product formed by reacting two to three mols of formaldehyde for each mol of phenol in the presence of 3¼% to 5% of salicylic acid based on the water present in the reaction mixture at a temperature just short of boiling with substantially no reflux, stopping the reaction at the first sign of resin separation, cooling the reaction mixture, and separating the phenol-formaldehyde resin layer from the reaction mixture, said phenol-formaldehyde product having a viscosity range between water-like and a thin syrup, being hardenable by heating several hours at a temperature of substantially 320° F. without progressing to the infusible state and becoming infusible when heated to temperatures of substantially 450° to 470° F.

6. A hardened composition of matter produced from phenol-formaldehyde condensation product formed by reacting two to three mols of formaldehyde for each mol of phenol in the presence of an acid catalyst selected from the group consisting of salicylic acid, ethyl salicylic acid and butyl salicylic acid in a concentration of from 3¼% to 5% of the water present in the reaction mixture, heating to a temperature just short of boiling with substantially no reflux, stopping the reaction at the first sign of resin separation, cooling the reaction mixture to form a resin layer and a non-resin layer in the mixture, separating the resin layer from the mixture, adding from about 3% to 20% by weight of a hardening agent comprising substantially one part by volume of a strong mineral acid selected from the group consisting of hydrochloric acid and nitric acid, and substantially one part by volume of about 37% formaldehyde, and substantially three parts by volume of glycerine, said condensation product having a hardening time of from about 12 to 36 hours.

7. A hardened composition of matter produced from a partially reacted liquid phenol-formaldehyde condensation product formed by reacting two to three mols of formaldehyde for each mol of phenol in the presence of 3¼% to 5% of salicylic acid based on the water present in the reaction mixture at a temperature just short of boiling with substantially no reflux, stopping the reaction at the first sign of resin separation, cooling the reaction mixture to form a resin layer and a non-resin layer in the mixture, separating the resin layer from the mixture, and adding substantially 10% of a hardening agent comprising substantially one part by volume of about 36% hydrochloric acid, substantially one part by volume of about 37% formaldehyde and substantially three parts by volume of a non-volatile and non-retardant carrying agent of the group consisting of glycerine, tricresyl phosphate and dibutyl phthalate.

8. A hardened composition of matter produced from a partially reacted liquid phenol-formaldehyde condensation product formed by reacting two to three mols of formaldehyde for each mol of phenol in the presence of an acid catalyst selected from the group consisting of salicylic acid, ethyl salicylic acid and butyl salicylic acid in a concentration of from 3¼% to 5% of the water present in the reaction mixture, heating the reaction mixture at a temperature just short of boiling with substantially no reflux, stopping the reaction at the first sign of resin separation, cooling the reaction mixture to form a resin layer and a non-resin layer in the mixture, separating the resin layer from the mixture and adding about 10% of a hardening agent comprising substantially one part by volume of about 36% hydrochloric acid, substantially one part by volume of about 37% formaldehyde and substantially three parts by volume of a non-volatile and non-retardant carrying agent selected from the group consisting of glycerine, tricresyl phosphate and dibutyl phthalate.

CHARLES H. SCHUH.